United States Patent
Kerger et al.

(10) Patent No.: US 6,923,430 B2
(45) Date of Patent: Aug. 2, 2005

(54) VALVE

(75) Inventors: Léon Kerger, Mondorf-les-Bains (LU); Claude Goffin, Chenois (BE)

(73) Assignee: Torrent Trading, Ltd., Tortola (VG)

( * ) Notice: Subject to any disclaimer, the term of this patent is extended or adjusted under 35 U.S.C. 154(b) by 202 days.

(21) Appl. No.: 10/265,352

(22) Filed: Oct. 4, 2002

(65) Prior Publication Data

US 2004/0041116 A1 Mar. 4, 2004

(30) Foreign Application Priority Data

Aug. 27, 2002 (EP) .............................. 02078571

(51) Int. Cl.⁷ ................................ F16K 5/02
(52) U.S. Cl. .................. 251/288; 251/284; 251/287
(58) Field of Search .................. 251/284–288

(56) References Cited

U.S. PATENT DOCUMENTS

| | | |
|---|---|---|
| 135,981 A | 2/1873 | Fogarty |
| 891,672 A | 6/1908 | Crane |
| 1,331,025 A | 2/1920 | Riggin |
| 1,532,251 A | 4/1925 | Lorraine |
| 1,832,725 A | 11/1931 | Mueller |
| 2,001,035 A | 5/1935 | Noll |
| 3,066,908 A | 12/1962 | Floren et al. |
| 3,107,546 A | 10/1963 | Rowland |
| 3,254,872 A | 6/1966 | Roos |
| 3,361,148 A * | 1/1968 | Turek ...................... 137/68.16 |
| 4,776,565 A | 10/1988 | Sheen |
| 4,809,949 A | 3/1989 | Rakieski |
| 4,927,116 A | 5/1990 | Schwarz et al. |
| 6,783,112 B2 | 8/2004 | Kerger et al. |

FOREIGN PATENT DOCUMENTS

EP          1124081 A1      8/2001

* cited by examiner

Primary Examiner—J. Casimer Jacyna
(74) Attorney, Agent, or Firm—Leydig, Voit & Mayer, Ltd.

(57) ABSTRACT

A valve which intended to control the flow of a fluid, for example a gas, comprises a valve body (50), an internal member for opening and shutting-off the passage of the gases, an operating handwheel (56) connected to the opening and shut-off member, and means limiting movement of the operating handwheel (56) and of the opening and shut-off member in the direction of opening of the valve. To avoid the valve jamming in the open position, said means limiting the movement of the operating member includes a stop (60) and of a mating stop (62), with frontal contact, arranged respectively on a rotary element and on the body of the valve (50) or vice versa. To ensure optimum contact between the stop (60) and the mating stop (62), the latter forms part of an element the angular position of which can be adjusted.

5 Claims, 4 Drawing Sheets ated member, the stop and the mating stop do not yet come
VALVE

CROSS-REFERENCE TO RELATED PATENT APPLICATIONS

This patent application claims the benefit of European patent application 02 078 571.3, filed Aug. 27, 2002.

FIELD OF THE INVENTION

The present invention relates to a valve for controlling the flow of a fluid, comprising a valve body, an internal member for opening and shutting-off the passage of the fluid, a rotary operating member that can be turned through several turns, a connecting means connecting the operating member to the shut-off member, means limiting movement of the operating member and of the opening and shut-off member in the direction of opening of the valve, these means comprising a stop and of a mating stop which are arranged respectively on a rotary element and on a fixed element of the valve, or vice versa, and mutual contact of which does not occur until the end of the last turn of the operating member when opening the valve. The invention also relates to a method of assembling such a valve.

BACKGROUND OF THE INVENTION

Although not limited thereto, the invention relates more particularly to a valve for bottles or reservoirs containing liquefied or compressed gas. In this kind of valve, the connecting means may be a rod and the means of limiting the movement in the direction of opening generally includes one or two pins passing through the body of the valve in the transverse direction at right angles to the movement of the rod and tangentially with respect to the latter. For this, the rod comprises, in its central region, an annular constriction allowing the passage of the two pins and allowing the rod to turn. These two pins and the base of the constriction form stops and mating stops defining the end of travel of the rod and halting the valve-opening movement.

The disadvantage of this known system is that at the end of the movement and given that the valve is generally opened wide, the end of the constriction of the rod approaches the two pins tangentially because of the turning of the rod. In consequence, contact between the rod and the pin or pins is a friction or rubbing contact, that is to say occurs with progressive binding, or even jamming of the valve in the open position.

This binding or jamming of the valve requires a great deal of manual force when closing the valve and encourages the use of a tool, such as pliers. This may, however, be the root of carelessness and has already caused accidents when closing the valve. Thus, when the valve is jammed in this way, it is sometimes the case that the operator does not know whether the valve is open or closed, and an operator has already, when wishing to slacken off the valve using a tool, turned the operating member in the wrong direction, that is to say in the direction for opening, with the result of breaking the head of the valve. This may obviously constitute a serious danger if the gases are harmful or explosive.

To avoid such jamming, document EP 1 124 081 A1 proposes a valve of the kind described in the preamble. In this valve, there is no rubbing contact between the stop and the mating stop and there is therefore no risk of the valve binding or jamming. The operator can easily shut-off the valve without exerting excessive force and without the risk of mistaking which direction to turn in and of binding the valve still further.

During opening, and in the penultimate turn of the operating member, the stop and the mating stop do not yet come into contact, which means that when they stop the turning of the operating member, they are in mutual contact over a height which is shorter than the pitch of the screw threads between the rotary elements and the body of the valve.

However, a valve as described in the aforementioned document does not operate reliably unless the stop and the mating stop contact over a large part of their mutual surfaces, that is to say over most of their axial length. If, for example, the stop and the mating stop are, the penultimate time the stop passes the mating stop, still separated by an axial distance which is barely smaller than the pitch of the screw which axially moves the moving stop, then the two stops will come into mutual contact only via their respective axial edges in order to stop the turning. Now, this may, in the long-term, lead to wear on their contacting edge and finally culminate in frictional contact, placing the valve back in the problematical situation described above.

This risk is therefore dependent on parameters which are of deciding importance to the area of contact between the stop and the mating stop. These are, in this instance, the pitch of the screw which axially moves the moving stop, the respective angular positions of the moving stop and of the mating stop, and the manner of assembly.

BRIEF SUMMARY OF THE INVENTION

The object of the present invention is therefore to provide a valve of the kind described in the preamble and a method of assembling this valve in such a way as to guarantee good contact between the stop and the mating stop and thus ensure effective valve operation.

To achieve this objective, the invention provides a valve of the kind described in the background which is characterized in that the mating stop forms part of a separate element independent of the body of the valve and in that means are provided for fixing said element into the body of the valve in a determined axial position and a determined angular position corresponding to maximum contact with the moving stop when the valve is in the open position.

The moving stop may be formed of a radial tab extending from the connecting means.

The fixed stop may be formed of an annular ramp of axial slope forming part of a washer fitted between the body of the valve and the connecting means.

The means for fixing said washer in a determined axial and angular position preferably comprises a radial shoulder provided in the body of the valve and collaborating with the peripheral annular region of the washer around the ramp forming the mating stop and of an annular cylindrical bushing provided with an internal screw thread screwed onto a corresponding screw thread of the connecting means and with an external screw thread screwed into a corresponding internal screw thread of the body of the valve, the washer being fixed axially and radially by its becoming jammed on the shoulder of the body of the valve when the bushing is screwed into the body of the valve.

To improve the fixing of the angular position of the washer, the peripheral annular surface thereof which is fitted over the radial shoulder of the body of the valve may have surface roughnesses. It is also possible to provide a compressible O-ring between the washer and its shoulder.

The method of assembling a valve as defined hereinabove comprises:

connecting the end of the connecting means to the valve opening and shut-off member if this means and this member are separate elements;

slipping the element comprising the mating stop on from the opposite end to the connecting means;

angularly positioning the connecting means and said element in such a way that the stop and the mating stop are in mutual contact;

engaging the connecting means with said element in the body of the valve in an axial position corresponding to the valve being open;

Fixing said element in this axial and angular position.

Thus, it is always certain that, whatever the pitch of the screw used to move the moving stop, the fixed stop will always be in an angular position which corresponds to maximum contact between the stop and the mating stop. The only condition is that the axial length envisaged for contact between the stop and the mating stop be slightly shorter than the pitch of the screw so that they can pass one another without knocking during the penultimate turn of opening the valve.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
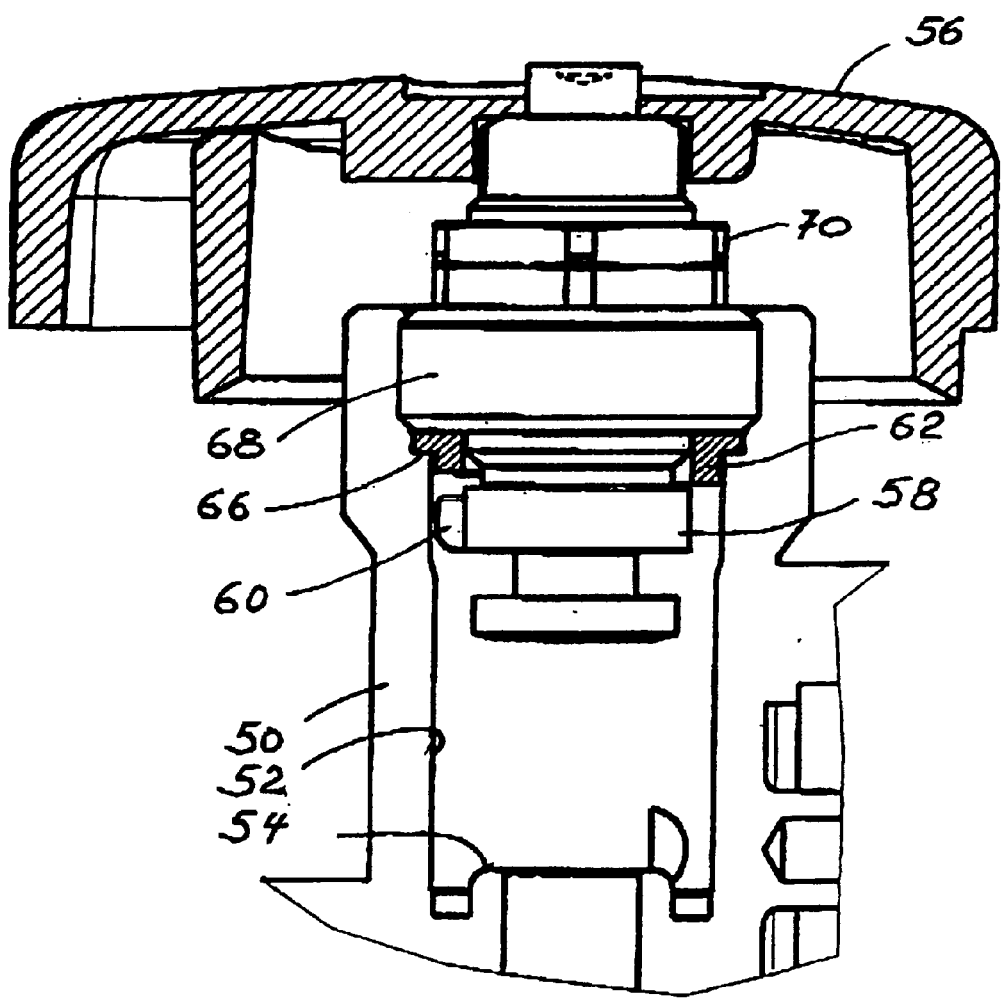
FIG. 1 is a view in part section of part of a valve according to the present invention.
Figure 2:
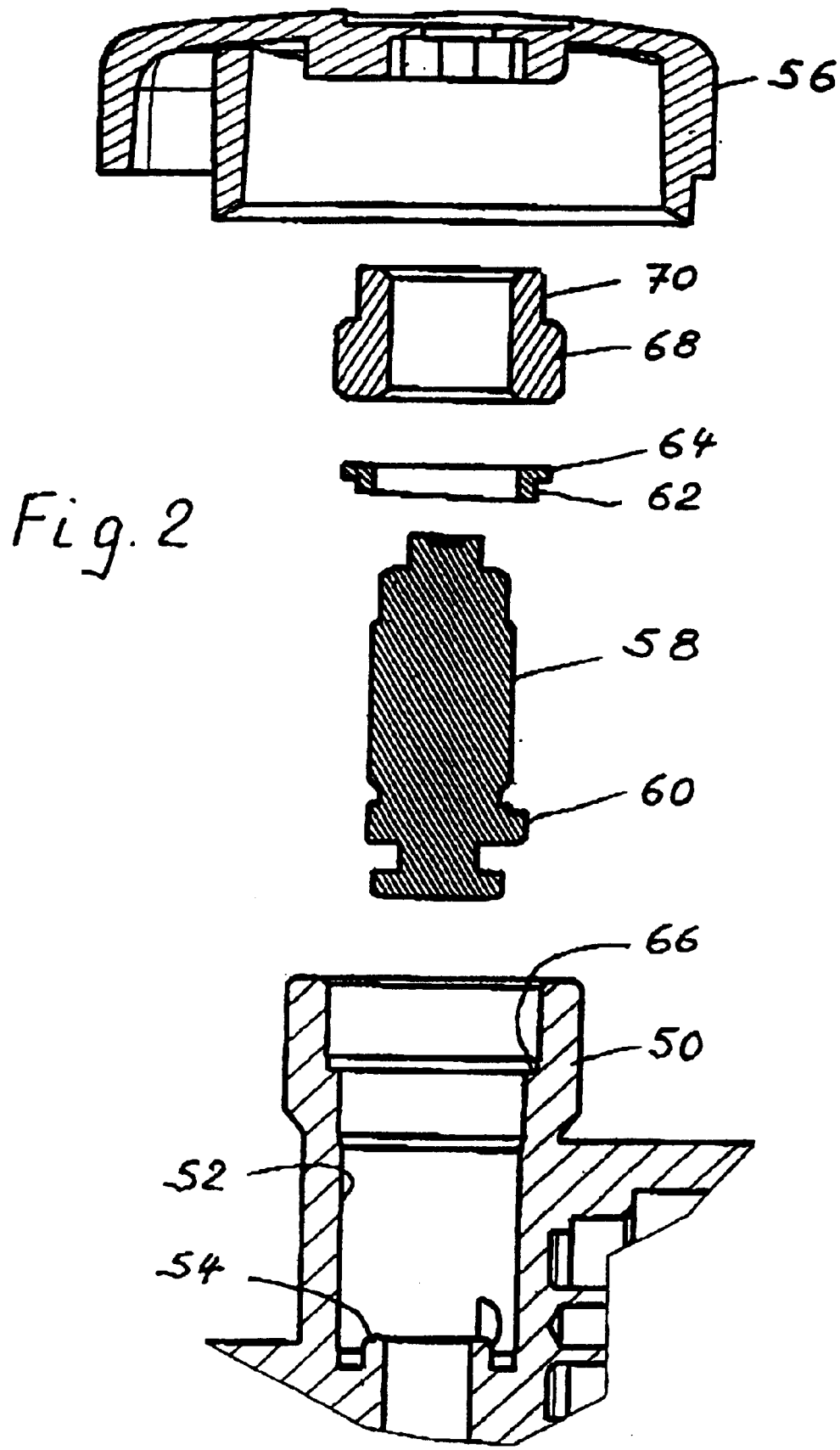
FIG. 2 shows the valve of FIG. 1 in a partial exploded view.

Reference will be made first of all to FIGS. 1 and 2 simultaneously, which figures depict only those elements which are necessary for understanding the invention. The valve comprises a valve body 50, preferably made of metal, for example made of bronze and through which there passes axially a cylindrical bore 52 in which there is a seat 54 at the intersection between an inlet connector and an outlet connector for fluid, for example gas.

The valve is operated by an operating handwheel 56 which is fixed, for example using a screw or any other means, to a connecting rod 58 which is screwed into the upper part of the body 50. At the opposite edge to the handwheel 56, the rod 58 is connected directly or indirectly to an opening or shut-off member, not shown, which collaborates with the seat 54 to uncover or shut off the passage for the gas. The opening and shut-off member could also constitute the lower part of the rod although it is preferable to have a separate opening and shut-off member which does not turn with the connecting rod 58.

Turning the operating handwheel 56 therefore causes axial translation of the rod 58 and of the opening and shut-off member in the bore 52 of the body 50 of the valve.

The valve comprises, as in document EP 1 124 081 A1, a moving stop and a fixed mating stop to determine the open position of the valve. The moving stop depicted as 60 is on the lower part of the rod 58 and, in the embodiment depicted, is in the form of a tab which extends radially from the rod 58.

Unlike in the aforementioned document, the fixed mating stop, shown as 62, does not form part of the body 50 of the valve, but of a separate element, in this instance a washer 64, surrounding the connecting rod 58 and resting on an interior radial shoulder 66 of the bore 52. In the example depicted, the mating stop is in the form of an annular ramp with an axial slope which spirals from the interior part of the washer 64 and the axial step of which forms the actual stop which collaborates with the moving stop. The mating stop could just as easily includes a simple tab extending axially from the washer.

The washer 64 is fixed and wedged on its seat or shoulder 66 using an annular cylindrical bushing 68. The latter has an internal screw thread intended to be screwed onto a corresponding external screw thread of the rod 58. The bushing 68 also comprises an external screw thread intended to be screwed into a corresponding internal screw thread provided in the bore 52 above the shoulder 66. The bushing 68 finally comprises a polygonal head 70 so that it can easily be tightened using a spanner.

In order to assemble the valve, the washer 64, as seen in FIG. 2, is fitted from above around the rod 58. The upper part of the rod is then fitted from below into the bushing 68 and screwed home there into. This screwing of the rod 58 into the bushing 68 corresponds to the scenario of opening the valve. This screwing of the rod 58 automatically brings the stop 60 into contact with the mating stop 62 when the rod is screwed home. The assembly thus formed comprising the rod 58, the washer 64 and the bushing 68 is then engaged in the body 50 and is screwed thereinto using the external screw thread of the bushing 68 until the washer 64 is wedged between the shoulder 66 and the lower edge of the bushing 68.

During screwing, the mutual contact between the stop 60 and the mating stop 62 remains preserved. If a discrepancy has become introduced during handling, then this discrepancy is cancelled out again automatically by friction between the time of the first contact of the washer 64 with the shoulder 66 and the end of the tightening.

To improve the angular positioning of the washer it is advantageous to provide, under its outer edge that sits on the shoulder 66, roughnesses or a compressible O-ring or other annular seal. It is thus certain that the mating stop 62 is wedged in an axial and angular position which corresponds to the maximum contact with the moving stop 60 when the valve is in the open position.

Figure 3:
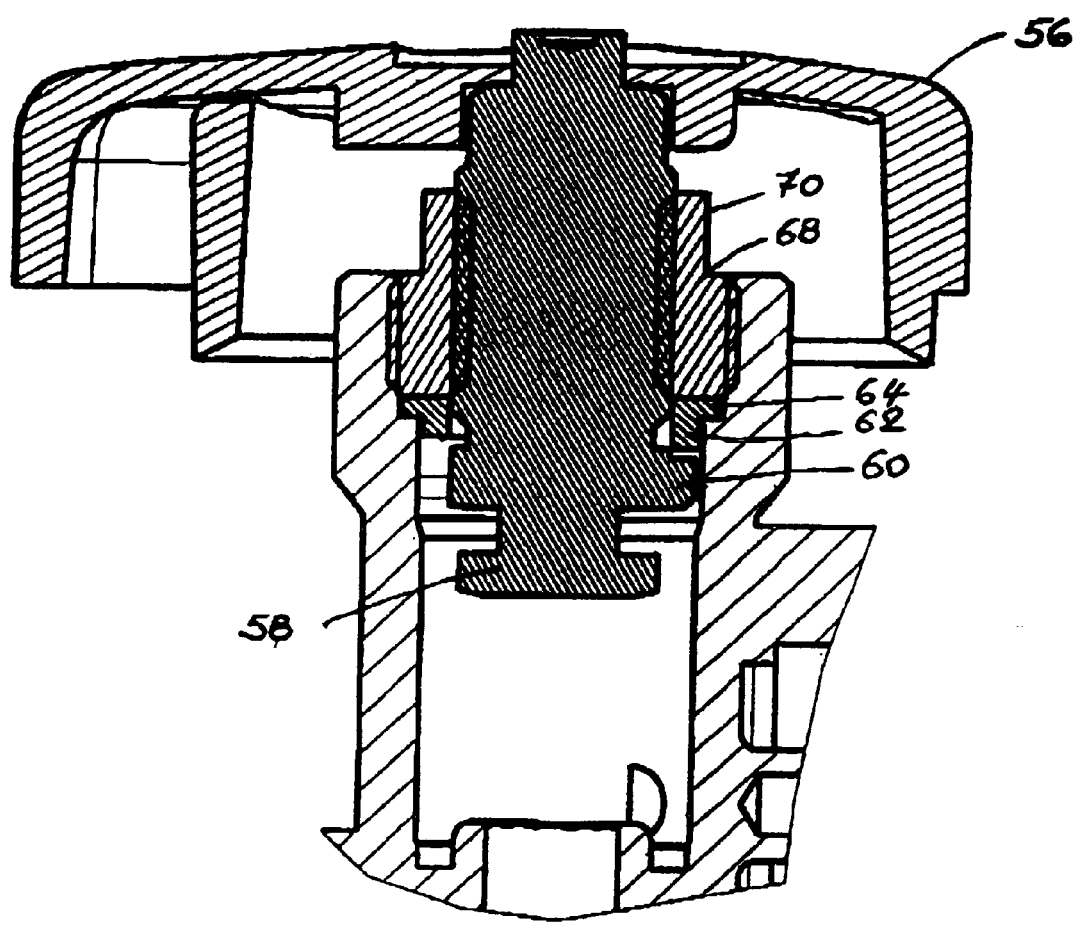
FIG. 3 shows a sectioned view of the valve in the opening phase corresponding to the penultimate turn of the operating handwheel.
Figure 4:
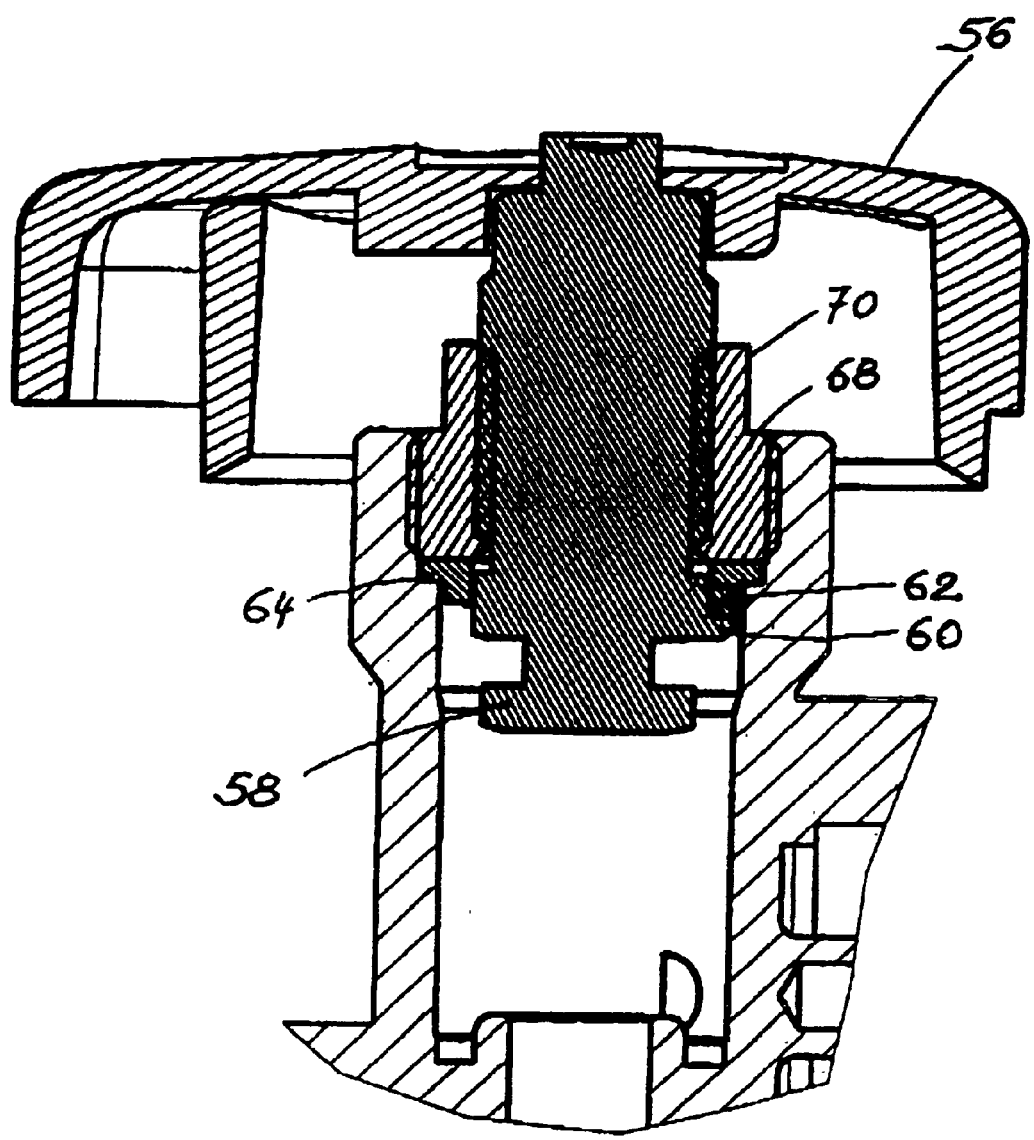
FIG. 4 shows a view similar to that of FIG. 3 in the wide open position.

FIGS. 3 and 4 show the valve in the final phase of its opening operation. In FIG. 3, the valve is at the end of the penultimate turn of the operating handwheel 56 when the moving stop 60 of the rod 58 passes the fixed mating stop 62. It can be seen that it is still separated therefrom by a sufficient axial distance to pass it without knocking it.

By contrast, at the end of the next turn, the position of which is depicted in FIG. 4, the tube has undergone an axial movement corresponding to the pitch of the external screw thread of the rod 58 which ends the opening movement by mutual contact between the stop 60 and the mating stop 62 over a relatively large surface of the latter.

The bushing 68 used in the embodiment depicted to axially and angularly fix the washer 64 and the mating stop 62 is merely one advantageous example which can be replaced by other fixing means. The essential feature is for the rod to be able to be assembled with the mating stop in a position of contact with the moving stop and for the mating stop to be able to be fixed in the angular position of the valve being open.

Although the embodiment described hereinabove is the preferred embodiment, it is possible to provide the washer with the mating stop on the outside of the valve body so as to collaborate with a stop provided on the peripheral skirt of the operating handwheel. The mating stop could then comprise a tab extending radially from the washer. This washer would then be wedged between the upper edge of the body 50 of the valve and a protruding radial shoulder located immediately under the head 70 of the bushing 68. Installation would then include fitting the washer from below onto the rod 58 and the bushing 68, in introducing the latter from above into the body 50 of the valve, in screwing the bushing 68 into the body 50 until its radial shoulder is axially in contact with the washer but without the latter being wedged, in turning the handwheel 56 to the open position, in turning the washer until its mating stop is in optimum contact with the stop on the handwheel 56, and in fixing the washer in this angular position by fully tightening the bushing 68 into the body 50 of the valve.

The invention is not restricted to a gas valve either but is suitable for all types of valve for fluids or liquids.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. Valve for controlling the flow of a fluid, comprising a valve body (50), an internal member for opening and shutting-off the passage of the fluid, a rotary operating member (56) that can be turned through several turns, a connecting means (58) connecting the operating member (56) to the shut-off member, means limiting movement of the operating member and of the opening and shut-off member in the direction of opening of the valve, these means comprises a stop (60) and of a mating stop (62) which are arranged respectively on a rotary element and on a fixed element of the valve, or vice versa, and mutual contact of which does not occur until the end of the last turn of the operating member (56) when opening the valve, characterized in that the mating stop (62) forms part of a separate element (64) independent of the body (50) of the valve and in that means are provided for fixing said element (64) into the body of the valve in a determined axial position and a determined angular position corresponding to maximum contact with the moving stop (60) when the valve is in the open position.

2. Valve according to claim 1, characterized in that the moving stop (60) is formed of a radial tab extending from the connecting means (58).

3. Valve according to claim 1, characterized in that the fixed stop (62) is formed of an annular ramp of axial slope forming part of a washer (64) fitted between the body (50) of the valve and the connecting means (58).

4. Valve according to claim 3, characterized in that the means for fixing said washer (64) in a determined axial and angular position comprises a radial shoulder (66) provided in the body (50) of the valve and collaborating with the peripheral annular region of the washer (64) around the ramp forming the mating stop (64) and of an annular cylindrical bushing (68) provided with an internal screw thread screwed onto a corresponding screw thread of the connecting means (58) and with an external screw thread screwed into a corresponding internal screw thread of the body (50) of the valve, the washer (64) being fixed axially and radially by its becoming jammed on the shoulder (66) of the body of the valve when the bushing (68) is screwed into the body (50) of the valve.

5. Valve according to claim 4, characterized in that the peripheral annular surface of the washer (64) which is fitted over the radial shoulder (66) of the body (50) of the valve has surface roughnesses.

\* \* \* \* \*